No. 689,289. Patented Dec. 17, 1901.
T. CONWAY.
HORSESHOE.
(Application filed Feb. 16, 1901.)
(No Model.)
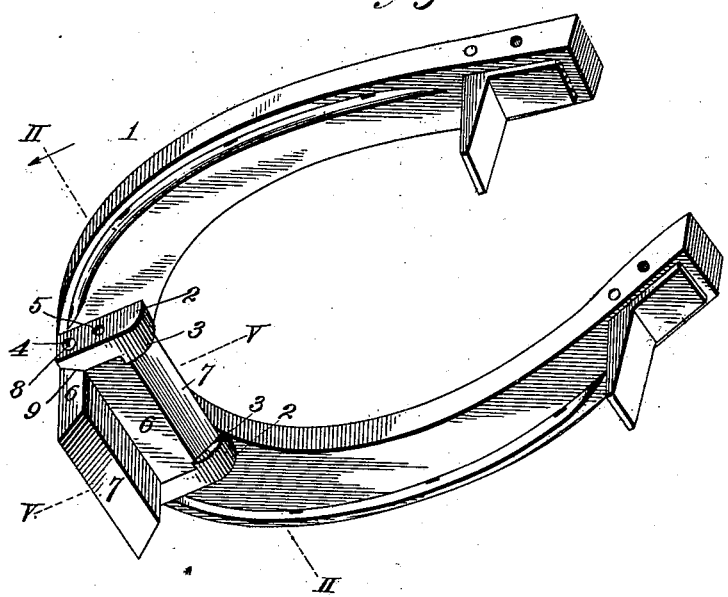
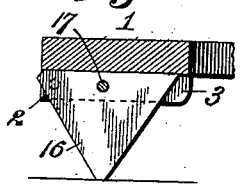
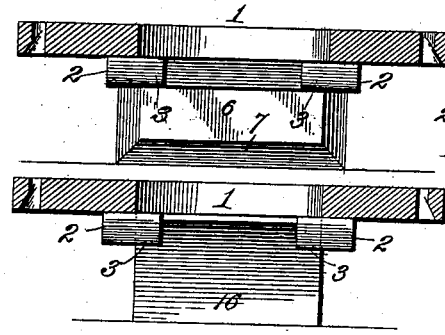
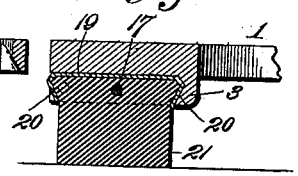
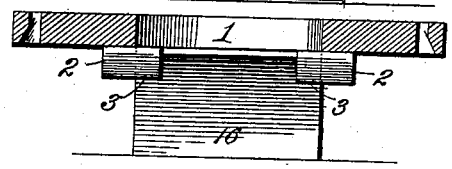
Witnesses:
H. C. Rodgers
M. R. Remley
Inventor:
Thomas Conway,
By Fischer & Thorpe
attys.

UNITED STATES PATENT OFFICE.

THOMAS CONWAY, OF KANSAS CITY, MISSOURI.

HORSESHOE.

SPECIFICATION forming part of Letters Patent No. 689,289, dated December 17, 1901.

Application filed February 16, 1901. Serial No. 47,558. (No model.)

*To all whom it may concern:*

Be it known that I, THOMAS CONWAY, a citizen of the United States, residing at Kansas City, in the county of Jackson and State of Missouri, have invented a new and useful Horseshoe, of which the following is a specification.

My invention relates to horseshoes, and more especially to that type embodying removable calks; and my object is to produce a horseshoe of this character which permits of the use in connection therewith of calks of several different styles.

A further object is to produce a horseshoe which possesses the desirable features of simplicity, strength, durability, and cheapness of construction.

Other objects of the invention will hereinafter appear, and in order that it may be fully understood reference is to be had to the accompanying drawings, in which—

Figure 1 is a perspective, as viewed from the under side, of a horseshoe embodying my invention. Fig. 2 is a cross-section taken on the line II II of Fig. 1. Fig. 3 is a section taken on the line V V of Fig. 1, but with a modified form of toe-calk in lieu of the form shown in Fig. 1. Fig. 4 is a view similar to Fig. 2, but with the calk shown in Fig. 5 in place. Fig. 5 is a view similar to Fig. 3, with a resilient calk.

In the said drawings, 1 designates a horseshoe of the usual or any preferred construction as far as its general form and method of securing it to the hoof is concerned, but provided at its toe end with the depending parallel lugs 2, extending longitudinally of the shoe and provided at their rear ends with the inwardly-projecting shoulders or stops 3. Said lugs are also provided at their front ends with the transversely-alined holes 4 and about midway their length with the similar holes 5.

My preferred form of toe-calk for winter use comprises a pair of integral arms 6, extending at right angles to each other and beveled to a point or edge, as at 7, and to secure said calk in place it is arranged with one arm depending and the other projecting rearward and is slipped between lugs 2 and against shoulders or stops 3, which latter fit snugly against the beveled portion of the horizontal arm and in conjunction with the bolt 8, extending through holes 4 of the lugs, and the interposed calk serve to maintain the latter reliably in place, the said shoulders 3, by overcoming any tendency of the calk to move rearward and swing forward, relieving the bolt of strain in a large measure. With this form of calk I also prefer to have the lugs 2 beveled to provide rearwardly-converging surfaces 9, (one only of which appears, see Fig. 1,) against which the flaring portions of the arms may bear rearwardly to assist shoulders 3 in relieving the bolt of strain.

It is obvious that double wear is obtained from the use of a calk of this type, because when one arm gets dull the position of the calk can be reversed, so as to cause the sharp arm to depend and the dull arm to fit between the lugs.

For ordinary service in lieu of sharpened calks, as above described, I prefer to use triangular calks 16. These calks are adapted to fit snugly between lugs 2, and the toe-calk is held in position by a transverse bolt 17, extending therethrough and through the lug-holes 5, said bolt being relieved largely of strain by the shoulders 3. (See Fig. 3.)

For light work I prefer to employ in lieu of the calks described a calk consisting of a metallic casing 19, having sloping ends, as at 20, to accommodate shoulders 3, and a resilient body portion 21, of suitable rubber or rubber composition, this calk being held in position, preferably by a bolt 17 and the shoulders 3, in the manner above described.

Heel-calks of the same type in some particulars as those described are shown; but as the particular construction of these heel-calks has no bearing on the present invention they are not described or claimed.

As the advantages incidental to the use of removable calks and cushioned calks are well known in the art and, in fact, to the public, it is unnecessary in this connection to point out all of the advantages, direct or indirect, which result from their use, and while I have illustrated and described the preferred embodiment of the invention it is apparent that the construction can be modified in various particulars without departing from the spirit and scope of the invention and that I reserve the right to make all changes which fall below the dignity of invention.

Having thus described the invention, what I claim as new, and desire to secure by Letters Patent, is—

1. A horseshoe, provided with heel-calks, parallel lugs depending from the toe end of the shoe and provided with inwardly-projecting shoulders at their rear ends, and transversely-alined holes forward thereof, a toe-calk fitting against the under side of the shoe and between said lugs and bearing against said shoulders, and a bolt extending through said lug-holes and the interposed calk, substantially as described.

2. A horseshoe, provided with heel-calks, parallel lugs depending from the toe end of the shoe and provided at their rear ends with inwardly-projecting shoulders having upwardly and rearwardly sloping front faces, a toe-calk provided at its rear side with a surface extending substantially parallel with the sloping faces of the shoulders, and adapted to fit snugly between said lugs and have its sloping surface engaging said faces of said shoulders, and a bolt to extend through said lugs and the interposed calk to hold the latter in place, substantially as described.

3. A horseshoe, provided with heel-calks, parallel lugs depending from the toe end of the shoe and provided with inwardly-projecting shoulders at their rear ends, and having at their front ends rearwardly-converging surfaces, and a toe-calk to fit snugly between said lugs and against said shoulders, and provided with sloping surfaces to bear rearwardly against the rearwardly-converging surfaces of the lugs, substantially as described.

4. A horseshoe, provided with heel-calks, parallel lugs depending from the toe end of the shoe and provided with inwardly-projecting shoulders at their rear ends, and a toe-calk provided with a plurality of arms or tread-surfaces, adapted to fit snugly between said lugs and against said shoulders, and a bolt to extend through said lugs and the interposed calk, substantially as described.

In testimony whereof I affix my signature in the presence of two witnesses.

THOMAS CONWAY.

Witnesses:
H. C. RODGERS,
G. Y. THORPE.